UNITED STATES PATENT OFFICE.

JOHN D. KING, OF FAIRBURY, NEBRASKA, ASSIGNOR OF ONE-HALF TO WILLIAM P. FREEMAN, OF SAME PLACE.

ARTIFICIAL STONE.

SPECIFICATION forming part of Letters Patent No. 312,356, dated February 17, 1885.

Application filed January 12, 1885. (No specimens.)

*To all whom it may concern:*

Be it known that I, JOHN D. KING, a citizen of the United States, residing at Fairbury, in the county of Jefferson and State of Nebraska, have invented certain new and useful Improvements in Artificial Stone; and I do hereby declare that the following is a full, clear, and exact description of the same.

My composition consists of the following ingredients, viz: sand, cement, water, soluble glass, borax, saltpeter, dried alum, and salt, which are to be used and combined in the manner and in the proportions hereinafter specified.

In preparing this composition, I take four parts of clean sand, and add thereto one (1) part of cement, (the best English Portland K. B. S. brand preferred.) After the sand and cement have been completely mixed I dampen them with a solution composed of the following ingredients, which are first thoroughly mingled by agitation, viz: pure water, twelve gallons; soluble glass, four pounds; borax, one pound; saltpeter, one and one-half pound; dried alum, one-half pound. The mortar thus formed is then molded into any desired shape, or is spread to any required thickness. About six (6) hours after the mortar has been taken from the molds or spread I saturate it thoroughly with a brine composed of common salt and water, in the proportion of about three (3) pounds of salt to twelve (12) gallons of water.

I do not restrict myself to the precise proportions of the articles composing said composition, as they may be slightly varied, if necessary. The mortar should be rendered compact when being finally shaped. This I accomplish when placing it into molds by gently ramming or forcing it into them, and when spreading it by pressing it firmly. The stone thus produced can be molded into any desired or required useful or ornamental design or shape, and also can be safely and conveniently used in any capacity in which natural stone or brick are employed.

Having thus fully described my invention, what I claim, and desire to secure by Letters Patent of the United States, is—

The herein-described composition of matter to be used in the manufacture of artificial stone, consisting of sand, cement, water, soluble glass, borax, saltpeter, dried alum, and salt, in the proportions specified.

In testimony that I claim the above I have hereunto subscribed my name in the presence of two witnesses.

JOHN D. KING.

In presence of—
ALLEN M. TUNNELL,
WILLIAM WILEY.